United States Patent [19]

Maltese

[11] 4,450,646
[45] May 29, 1984

[54] ADJUSTABLE WEIGHT FISHING DEVICE

[76] Inventor: Peter C. Maltese, 156 Paree Dr., Pittsburgh, Pa. 15239

[21] Appl. No.: 365,041

[22] Filed: Apr. 2, 1982

[51] Int. Cl.³ .............................................. A01K 83/00
[52] U.S. Cl. .................................... 43/43.14; 43/44.81
[58] Field of Search ................. 43/43.14, 43.15, 44.81, 43/44.96, 42.11, 42.15, 42.39, 42.22; D22/30, 27

[56] References Cited

U.S. PATENT DOCUMENTS

| | | |
|---|---|---|
| D. 194,978 | 4/1963 | Andrews .............................. D22/30 |
| D. 203,509 | 1/1966 | Marino ................................. D22/27 |
| D. 255,703 | 7/1980 | Kent .................................... D22/27 |
| 77,774 | 5/1868 | Smith . |
| 549,332 | 11/1895 | Sewell . |
| 1,023,676 | 4/1912 | Pancoast . |
| 1,313,567 | 8/1919 | Ulrich . |
| 1,500,463 | 7/1924 | Mattern . |
| 2,565,163 | 8/1951 | Ball . |
| 2,589,715 | 3/1952 | Lysikowski . |
| 2,651,135 | 9/1953 | Greenleaf . |
| 2,729,014 | 1/1956 | Johnson .......................... 43/43.14 X |
| 2,735,212 | 2/1956 | Baum . |
| 3,461,597 | 8/1969 | Hobson . |
| 3,500,576 | 3/1970 | Ostrom . |
| 3,611,614 | 10/1971 | Ward ................................... 43/42.39 |
| 3,999,325 | 12/1976 | Folker .............................. 43/43.14 X |

Primary Examiner—Nicholas P. Godici
Assistant Examiner—Marc Hodak
Attorney, Agent, or Firm—Louis A. DePaul

[57] ABSTRACT

A fishing device wherein more than one portion thereof may be selectively and quickly broken off to decrease the weight of the fishing device. The fishing device comprises a substantially spherical body with a neck and hook attached thereto. The fishing device also comprises a tail portion arranged at approximately a 45° angle to the hook with the tail portion comprising at least two removable weights which when removed decreases the weight of the fishing device.

10 Claims, 4 Drawing Figures

ADJUSTABLE WEIGHT FISHING DEVICE

BACKGROUND OF THE INVENTION

Fishing devices of various shapes, sizes, and weights are used for various types and conditions of fishing. For example, depending on the type of fishing, bait, lure, casting, etc., various types of lures and accessories may be used. In addition, the type of fishing location, pond, stream, ocean, etc., may necessitate the use of a different fishing device. Moreover, the type of fishing or location may require that the fishing device be positioned at different depths in the water. Typically, various shapes and sizes of weights are used to adjust the buoyance of fishing device thereby adjusting the depth at which the fishing device will be positioned in the water. Commonly such weights are individually attached to the fishing line with the choice of the proper weight being made on a trial and error basis. The removal of a particular weight and the placement of a new weight on the line can be time consuming and detract from the main activity of fishing. In general, it would be preferrable to be able to quickly remove weight from the fishing device without having to dissassemble the fishing device, remove a particularly heavy weight, add a lighter weight, and then resume fishing. Therefore, what is needed is a fishing device capable of accommodating various fishing lures and capable of having weight removed therefrom without exchanging a heavy weight for a light weight.

SUMMARY OF THE INVENTION

A fishing device wherein more than one portion thereof may be selectively and quickly broken off to decrease the weight of the fishing device. The fishing device comprises a substantially spherical body with a neck and hook attached thereto. The fishing device also comprises a tail portion arranged at approximately a 45° angle to the hook with the tail portion comprising at least two removable weights which when removed decreases the weight of the fishing device.

BRIEF DESCRIPTION OF THE DRAWINGS

While the specification concludes with claims particularly point out and distinctly claiming the invention, it is believed the invention will be better understood from the specification taken in conjunction with the following drawings, wherein:

DESCRIPTION OF THE PREFERRED EMBODIMENT

Depending on the depth desired for fishing, various weights may be used on a fishing device. The invention described herein provides a fishing device wherein more than one portion thereof may be selectively and quickly broken off to decrease the weight of the fishing device.

Figure 1:
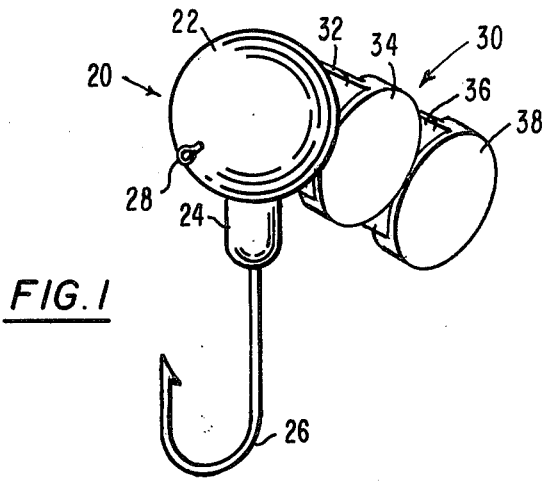
FIG. 1 is a view in perspective of the fishing device.
Figure 2:
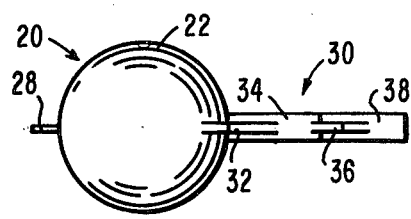
FIG. 2 is a top view of the fishing device.
Figure 3:
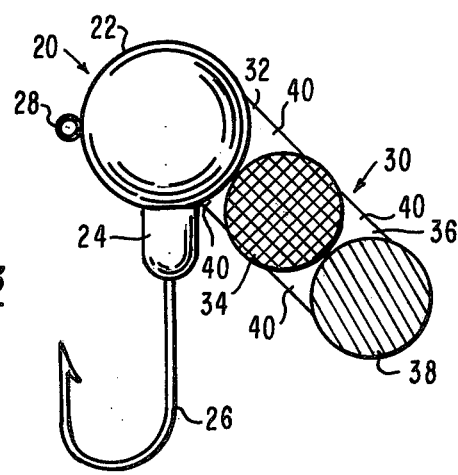
FIG. 3 is a side view of the fishing device.

Referring to FIGS. 1-3, the fishing device is referred to generally as 20 and comprises a substantially spherical body 22 with a substantially cylindrical neck 24 attached to body 22. Preferably neck 24 may be made integral with body 22 and of the same material as body 22. Neck 24 provides a means by which a hook 26 may be connected to body 22. Hook 26 may be a jig hook or may be of various types and lengths chosen from those used in the art of fishing. Typically, hook 26 may be be long enough to acommodate the placement of a lure or bait thereon (not shown).

Body 22 also has an attachment mechanism 28 such as an eyelet hook connected to body 22 at approximately a 90° angle to hook 26, as shown in FIG. 3, for providing a means by which a fishing line may be attached to fishing device 20. The location of attachment mechanism 28 at approximately 90° to hook 26 allows hook 26 to be positioned away from the bottom of the body of water in which it is submerged to prevent hook 26 from being snagged on objects on the bottom of the body of water.

Figure 4:
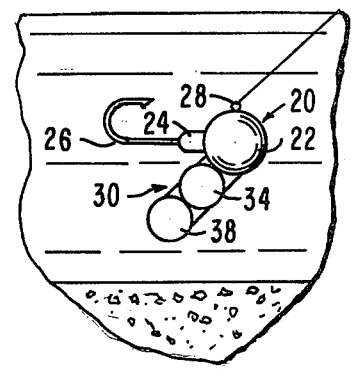
FIG. 4 is a diagram of the fishing device in water on a fishing line.

Still referring to FIGS. 1-3, fishing device 20 also comprises a tail portion 30 attached to body 22 at between approximately a 30° to 60° angle with respect to neck 24 and hook 26. Preferably, the angle between tail portion 30 and hook 26 should be approximately 45°. The arrangement of tail portion 30 with respect to hook 26 provides a relationship therebetween that allows hook 26 to be disposed away from the bottom of the body of water due to the weight of tail portion 30. The arrangement of tail portion 30 with respect to hook 26 and the arrangement of attachment mechanism 28 allows hook 26 to be disposed away from the fishing line and the bottom of the body of water as shown in FIG. 4. In addition, should fishing device 20 come to rest on the bottom of the body of water, it would be likely that tail portion 30 would come to rest on the bottom of the body of water with hook 26 positioned away from the bottom due to the unique configuration and weighting of fishing device 20.

Tail portion 30 comprises a first web 32 connected to body 22 and a first weight 34 connected to first web 32. Tail portion 30 also comprises a second web 36 connected to first weight 34 and a second weight 38 connected to second web 36. First web 32 and second web 36 may be thin ligament type members having a thickness of approximately ½ the thickness of first weight 34 and second weight 38. Each web member may be provided with a crevice 40 on the top and bottom thereof to increase the ease with which each web may be selectively broken for the purpose of removing first weight 34, second weight 38, or both weights. First weight 34 and second weight 38 may be substantially cylindrical members and are capable of being selectively and individually manually removed from fishing device 20 by breaking along crevice 40 of the particular web. In this manner, one or more weights may be easily removed from fishing device 20 so as to reduce the weight thereof and increase its buoyancy. In addition, first weight 34 may be colored yellow and second weight 38 may be colored green for appearance and attractiveness.

With the exclusion of hook 26, fishing device 20 may be made from a metal such as lead, tin, or zinc or a combination of them for providing proper weighting while allowing for easy removal of the weight portions by hand. For example, fishing device 20 may be made of between approximately 50-70% lead and between approximately 50-30% tin. Preferably, fishing device 20 may be made of approximately 60% lead and 40% tin. With these types of metals and with a size commonly used for fishing, fishing device 20 including hook 26 as shown in FIG. 3 may weigh approximately 7/16 oz. and float at a depth of approximately 8 to 10 feet. With second weight 38 and a portion of second web 36 removed, fishing device 20 may weigh approximtely 5/16 oz. and float at a depth of approximately 5 to 8 feet. With first weight 34, a portion of first web 32, and a portion of second web 36 additionally removed, fishing device 20 may weigh approximately 3/16 oz. and float at a depth of approximately 3 to 5 feet.

Therefore, the invention provides a fishing device capable of acommodating various fishing lures and capable of having weight removed therefrom in a quick and easy manner.

I claim as my invention:

1. A fishing device comprising:
    a substantially spherical body having a substantially cylindrical neck portion attached thereto;
    a hook attached to said neck portion; and
    a single tail portion having a plurality of removable members arranged between approximately a 30° to 60° angle with respect to the shank of said hook, with said removable members substantially rigidly connected in series through thin ligaments capable of being selectively and easily removed for decreasing the weight of said fishing device and increasing the buoyancy of said fishing device.

2. The fishing device according to claim 1 wherein said plurality of removable members comprise:
    a thin ligament first web attached to said body;
    a substantially cylindrical first weight attached to said first web;
    a thin ligament second web attached to said first weight; and
    a substantially cylindrical second weight attached to said second web with said webs providing a means to easily remove said weights from said fishing device.

3. The fishing device according to claim 2 wherein each of said webs has a crevice therein for facilitating the breakage of each of said webs individually.

4. The fishing device according to claim 3 wherein said tail portion is arranged at approximately 45° to the shank of said hook.

5. the fishing device according to claim 4 wherein said body has an attachment mechanism connected to the shank of said body at approximately 90° to said hook and substantially opposite said tail portion for accommodating the attachment of a fishing line thereto.

6. the fishing device according to claim 5 wherein said attachment mechanism comprises an eyelet hook.

7. The fishing device according to claim 6 wherein said body, said neck, and said hook weigh approximately 3/16 oz.

8. The fishing device according to claim 7 wherein said first weight weighs approximately ⅛ oz.

9. the fishing device according to claim 8 wherein said second weight weighs approximately ⅛ oz.

10. The fishing device according to claim 9 wherein said weights are a different color.

* * * * *